United States Patent
Hunger

[19]

[11] Patent Number: 6,050,715
[45] Date of Patent: Apr. 18, 2000

[54] METHOD AND APPARATUS FOR FORMING SURFACE LIGHTING

[75] Inventor: Darrell A. Hunger, Oakland, Calif.

[73] Assignee: Fiberstars, Inc., Fremont, Calif.

[21] Appl. No.: 09/006,277

[22] Filed: Jan. 13, 1998

[51] Int. Cl.⁷ ........................................... F21V 8/00
[52] U.S. Cl. ............................. 362/576; 362/581
[58] Field of Search .................... 362/551, 558, 362/559, 581, 582, 562, 576

[56] References Cited

U.S. PATENT DOCUMENTS

| | | | |
|---|---|---|---|
| 3,535,018 | 10/1970 | Vasilatos | 350/96 |
| 3,829,675 | 8/1974 | Mariani | 240/1 LP |
| 4,422,719 | 12/1983 | Orcutt | 350/96.3 |
| 4,761,047 | 8/1988 | Mori | 350/96.1 |
| 5,380,318 | 1/1995 | Daikuzuno | 606/16 |

FOREIGN PATENT DOCUMENTS

| | | |
|---|---|---|
| 58-1104 | 1/1983 | Japan . |
| 58-7603 | 1/1983 | Japan . |

OTHER PUBLICATIONS

B–K Lighting, Inc.—Glow Star Series Product Brochure, no date given.

Architectural Landscape Lighting—Garden Landscape Series Product Brochure, no date given.

Lumiére Design and Manufacture, Inc. Product Brochure, no date given.

*Primary Examiner*—Stephen Husar
*Attorney, Agent, or Firm*—Fenwick & West, LLP

[57] ABSTRACT

Apparatus and method for providing illumination at selected locations includes assembling a fixture for supporting an end of an optical fiber cable in relation to a diffusive or dispersive lens that is installed in a surrounding medium with a portion of the lens protruding therefrom. The protruding portion of the lens may be severed substantially flush with the surrounding medium to provide an optical outlet port for illuminating flux supplied by the optical fiber cable.

7 Claims, 2 Drawing Sheets

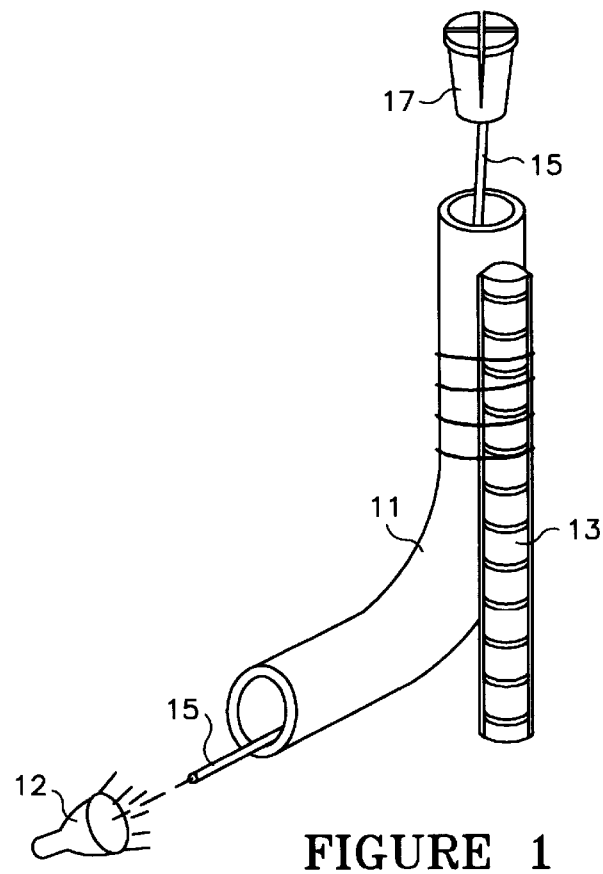
FIGURE 1
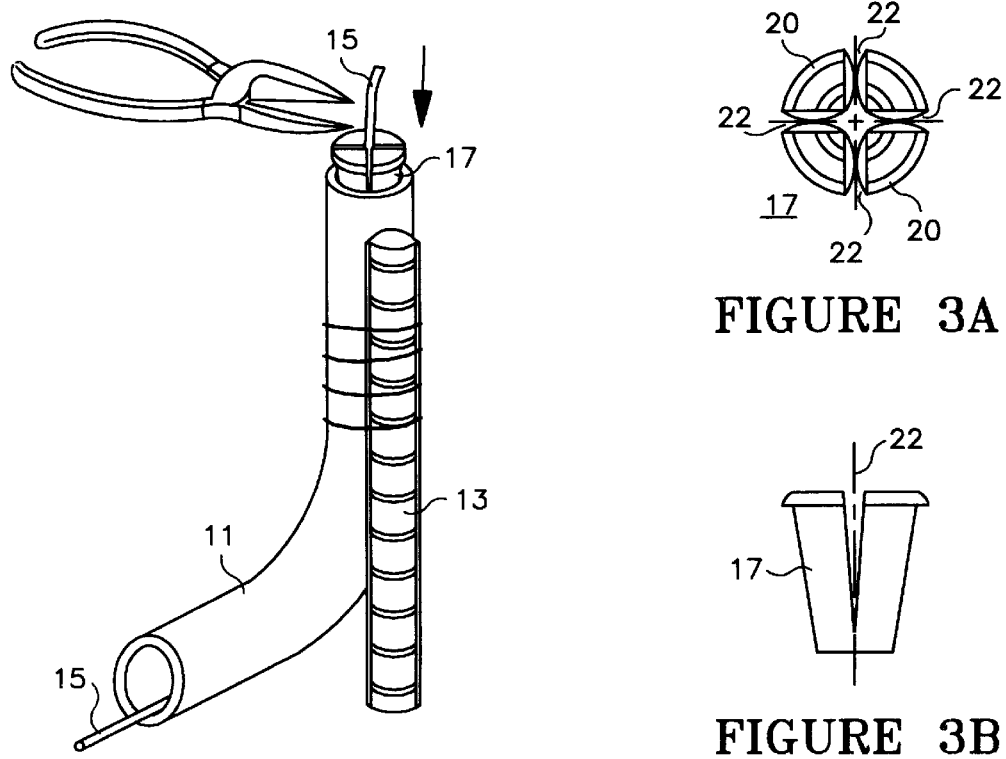
FIGURE 2
FIGURE 3A
FIGURE 3B

METHOD AND APPARATUS FOR FORMING SURFACE LIGHTING

RELATED APPLICATION

The subject matter of this application relates to the subject matter of application Ser. No. 08/713,603, filed on Sep. 13, 1996 by N. P. Kacheria, entitled "Lighting Apparatus and Method," now U.S. Pat. No. 5,708,749.

FIELD OF THE INVENTION

This invention relates to surface lighting fixtures, and more particularly to apparatus and method for forming lighting fixtures substantially flush with surrounding surfaces.

BACKGROUND OF THE INVENTION

Numerous decorative lighting and emergency lighting applications require reliable, weather-resistant, and unobstructive lighting fixtures to identify pathways, enhance illumination of objects of interest, and the like. One known scheme includes a plurality of individual low-voltage light bulbs disposed within a flexible, transparent tube to illuminate halls, exits, and stairsteps in low-level lighting areas such as theatres, airplanes, outdoor patios, and the like. Other schemes rely upon upright stanchions or box-like fixtures disposed away from a pathway to provide local-area illumination including the pathway that is thus indirectly lighted by fixtures at spaced locations along the pathway. Schemes of this type are described in the literature (See, for example, U.S. Pat. No. 5,479,322). In lighting schemes of these types, a lighting fixture of substantial dimensions may be located adjacent a pathway to provide the requisite illumination, and accordingly may constitute obstructions subject to damage in crowded circumstances, or while moving objects adjacent such fixtures. Also, such fixtures commonly require expensive conditioning for weather and splashy environments around pools, ponds, sprinkler systems, and the like, in order to remain operational with low maintenance over long operating intervals.

SUMMARY OF THE INVENTION

In accordance with the present invention, a fiber optic lighting fixture may be formed inexpensively for virtually indestructible service in pathways and wide-area surfaces without regard for impact of weather, water, crowds, or movement of objects since the fixture is flush with the surface, the fixture is unaffected by snow removing or sweeping equipment adjacent the lighting fixture. An optical fiber dispersing or diffusing lens may be positioned within the surface during formation (as prior to pouring a patio slab of concrete) for finishing substantially flush with the finished surface. Optical fibers transfer illuminating light flux from a remote light source to the dispersing or diffusing lens to provide surface illumination at selected locations in a finished floor, wall or ceiling that is unobtrusive and substantially immune from weather, crowds, water, and moving objects.

DESCRIPTION OF THE DRAWINGS

FIG. 1 is a perspective partial assembly view of some components of the present invention;

FIG. 2 is a perspective view according to FIG. 1 in which additional assembly is shown;

FIGS. 3A and 3B are, respectively, top and side views of the fiber-gripping collet according to the present invention;

DETAILED DESCRIPTION OF THE INVENTION

Figure 4:
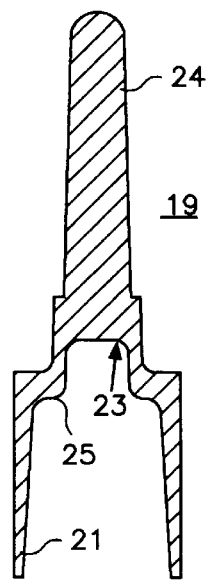
FIG. 4 is a sectional view of the diffusive lens component.

Referring now to FIG. 1, there are shown a few components of the fixture in partially assembled perspective. Specifically, a right-angle conduit, for example formed of conventional PVC conduit or tubing 11 may be positioned with an upper end thereof affixed, for example, to a reinforcing rod 13 within an area that is being prepared for the installation of cement, concrete, tile, or other flooring material of suitable type. An optical fiber cable 15 of one or more glass or plastic fibers is disposed through the conduit 11 and along a selected route from a remote light source 12 to a substantially vertical orientation projecting out of the upright end of the conduit 11. In another embodiment, such assembly may also be mounted for orienting the optical fiber cable 15 substantially horizontally (as for wall lighting in a pool, around an exit), or vertically downward (as for ceiling installations). A jam-fitting, plug-like member or collet 17 is disposed about the optical cable 15 for insertion into the upright, outlet end of the conduit 11. The plug-like member or collet 17 may be molded or otherwise formed of resilient material such as rubber or polymeric material to include outer walls that converge away from a top section which includes a plurality of slits 22 that intersect at the center, as shown in FIGS. 3A and 3B. Thus, as shown in FIG. 2, the member or collet 17 is disposed symmetrically about the optical cable 15 and is inserted into the outlet end of the conduit 11 to jam into the conduit and grip the cable 15 between the segments 20 of the top region that are disposed between slits 22 as the member 17 is press fitted into the conduit 11. Any portion of the optical cable 15 left protruding above the member 17 once inserted into the conduit 11 may be sliced or otherwise cut off at about the top of the member 17 to leave the optical cable 15 snugly secured centrally within the member 17 jammed into the conduit 11, with an end oriented axially to emit luminous flux therefrom substantially in the oriented direction.

Referring now to FIG. 4 there is shown a sectional view of a generally tapered, cylindrical component 19 that forms the diffusive or dispersive lens, and that seals the fixture against surface activity such as rain, water splash, particles, and organisms such as algae. The component 19 serves as a lens and is formed preferably as by molding or machining of an optically suitable material such as glass or plastic resin. The component 19 is formed with an internal recess 21 that receives the outer diameter of the conduit 11, and also includes a centrally-oriented inner recess 23 that aligns substantially with, and is spaced away from, the severed end of an optical fiber cable 15 secured in central position within a conduit 11. In this configuration, the component 19 is optimally referenced by the inner shoulder 25 at the interior terminus of the interior recess 21 against the end of a conduit 11, and the inner recess 23 is elevated selectively above the severed end of an optical fiber cable 15 that is secured within the conduit 11 by the member or collet 17. The elevated inner recess 23 thus serves as an optical input port for illuminating flux emanating from an end of an optical fiber cable 15.

The component 19 may include diffusive surface textures on exterior surfaces 24 as described for example in the aforecited Related Patent Application, or may include thread-like diffusive surface grooves along segments of the tapered outer walls at a level above the inner recess 23 for enhancing diffusion or dispersion of illuminating light flux within the volume of the component 19 out into the surrounding region. Also, such grooves may facilitate installation into ceiling panels, dry-wall panels, and the like, via screw-like threading into a pilot hole formed in such a panel.

Figure 5:
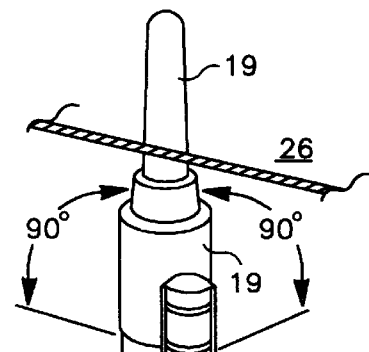
FIG. 5 is a perspective view of an assembly according to the present invention.

The component 19 is attached by adhesive or themo-bond or other attachment to the end of a conduit 11, as shown in FIG. 5, and this seals the interior recess 21 of the component 19 and the severed end of an optical fiber cable 15 against environmental contaminants.

Figure 6:
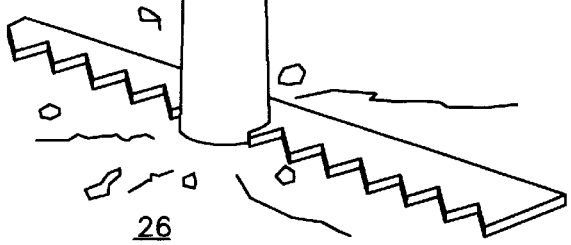
FIG. 6 is a perspective view of one scheme for finishing the assembly according to the present invention.

For installation within newly-prepared concrete, plaster, or the like, the assembled component 19 adhesively attached on the end of a conduit 11 is positioned, as on a reinforcing bar 13 or otherwise, with an upper portion of the component 19 positioned above the finished level 26 of the surrounding surface, as shown in FIG. 5. The surrounding surface is then formed and finished 26 as by pouring concrete, troweling plaster, or the like, to a level that is at least above the optical inlet port within inner recess 23. Component 19 includes upwardly tapering or converging outer surface as well as downwardly tapering or converging surfaces, with reference to the largest drainster at about the level of the inner shoulder 25, and these opposing tapers assure fixation in the surrounding material such as concrete that is poured into place. Thereafter, a portion of the component 19 may be severed at or about the plane of the finished surface, as shown in FIG. 6, to leave exposed a solid surface portion of the component which may then be polished or rough finished at or about the plane of the surrounding surface 26, as shown in FIG. 6. Fine sandpaper or polishing compound may be used to polish plastic resin material exposed by severing a portion of the component 19 that protrudes from the surrounding finished surface 26. Alternatively, the exposed surface of the component 19 once the protruding portion thereof is severed may be finished with faceted surfaces, or in dome-like configuration, or the like.

In another embodiment of the present invention, an upper portion of the component 19 may be installed through a pilot hole to protrude from a ceiling or wall panel to thereby provide wide-area diffusion or dispersion of radiant flux from an end of an optical fiber cable 15.

Therefore, the apparatus and method of the present invention provides inexpensive and highly effective illumination when installed as a fixture within or beneath finished surfaces to protrude sufficiently to provide directional or wide-area illumination.

What is claimed is:

1. Apparatus for emitting illuminating flux from within a surrounding supporting medium, the apparatus comprising:

a hollow base member having an outer end for disposition within the surrounding supporting medium;

a mounting element disposed near the outer end for supporting a source of illuminating flux near the outer end of the base member;

a transparent lens component positioned on the outer end of the base member for disposition within the surrounding supporting medium to enclose the mounting element and the source of illuminating flux supported thereby, and having an inner recess therein disposed as an optical inlet port substantially in alignment with the source of illumination in the base member, the lens component having an outer surface disposed as an optical outlet port to be configured relative to the surrounding supporting medium to provide illuminating flux emanating from the surrounding supporting medium.

2. Apparatus according to claim 1 wherein the source includes a fiber optical cable having one end thereof positioned to supply illuminating flux therefrom to the optical inlet port of the lens component, with said one end positioned at a selected spacing relative to said optical inlet port.

3. Apparatus according to claim 1 wherein said lens component includes a portion of the outer surface disposed substantially flush with a surface of the surrounding supporting medium to form thereby substantially the only optical outlet port for illuminating flux emanating from the surface of the surrounding supporting medium.

4. Apparatus according to claim 1 wherein the lens component is formed of plastic resin to facilitate configuring an outer surface thereof relative to the surrounding supporting medium.

5. A method for forming a source of illumination to emanate from within a surrounding supporting medium using a configurable lens component, the method comprising:

supporting a source of illuminating flux for containment within the surrounding supporting medium;

substantially supporting the source of illuminating flux relative to the configurable lens component for confining installation within the surrounding supporting medium with the configurable lens component protruding therefrom; and configuring the lens component relative to a surface of the supporting surrounding medium to radiate illuminating flux therefrom beyond the surface of the surrounding supporting medium.

6. A method for forming a source of illumination within a surrounding medium using a configurable lens component and an optical fiber cable to supply illuminating flux, the method comprising:

supporting the optical fiber cable with an end thereof disposed at a selected spacing from the configurable lens for containment within the surrounding medium;

substantially confining the optical fiber cable relative to the configurable lens component for installation within the surrounding medium with the configurable lens component protruding therefrom;

installing surrounding medium to surround and support the configurable lens component to a selected surface level from which the lens component protrudes; and severing the protruding portion of the lens component at a selected level with respect to the surface level of the surrounding medium to configure the lens component relative to a surface of the surrounding medium for radiating illuminating flux therefrom beyond the surface of the surrounding medium.

7. The method according to claim 6 wherein the protruding lens is severed substantially flush with the surface level of the surrounding medium.

* * * * *